Dec. 4, 1951          M. F. HALL          2,577,188

COMPOSITE OIL PAN FOR ENGINES

Filed April 1, 1948

MICHAEL F. HALL
INVENTOR.

BY

*Lyon & Lyon*

ATTORNEYS.

Patented Dec. 4, 1951

2,577,188

UNITED STATES PATENT OFFICE 2,577,188

COMPOSITE OIL PAN FOR ENGINES

Michael F. Hall, Bell, Calif.

Application April 1, 1948, Serial No. 18,325

14 Claims. (Cl. 184—106)

1

This invention relates to internal combustion engines and is particularly directed to a new and improved form of oil pan for such engines. Devices embodying my invention are particularly useful in connection with heavy duty engines for trucks, buses and the like, and are also applicable to automotive as well as aircraft engines.

Oil pans for heavy duty truck engines, for example diesel engines, have commonly been constructed in two general types. The first has been made of cast iron for economy and for resistance to fatigue failure by vibrations set up during operation of the engine. Cast iron oil pans are difficult to remove and replace, however, owing to their great weight, and the labor cost incident to removing and replacing such an oil pan becomes excessively high.

In an effort to reduce weight of the pan, thin gage welded steel oil pans have been introduced. While these are sufficiently light in weight to enable them to be installed and removed with facility, the resonant characteristics of the relatively thin gage metal amplifies vibrations set up by the engine with the result that fatigue cracks and failures develop. As a variation of the second type of oil pan described, aluminum alloys have been used in fabricating the various parts of the pan in an effort to reduce weight, as well as to provide heat transfer surface for cooling the oil within the pan. Such aluminum alloy pans have proved difficult and expensive to repair.

It is the principal object of my invention to provide a novel form of oil pan having the advantages of light weight, resistance to fatigue failure and excellent heat transfer properties for cooling oil within the pan.

Another object is to provide a composite oil pan for an internal combustion engine in which the side walls of the pan are formed of vibration absorbing nonmetallic material which is oil resistant and able to withstand any operating temperature which the lubricating oil may reach during operation of the engine.

Another object is to provide an oil pan of this type having removable metallic inserts provided with cooling fins for cooling the oil within the pan.

Another object is to provide a composite oil pan having a sump and a drain section and a sludge collector located therebetween.

Another object is to provide an oil pan of the type described having a metallic heat exchange member and a dam element adapted to

2 maintain a pool of oil on the heat exchange member.

Other objects and advantages will appear hereinafter.

Figure 1:
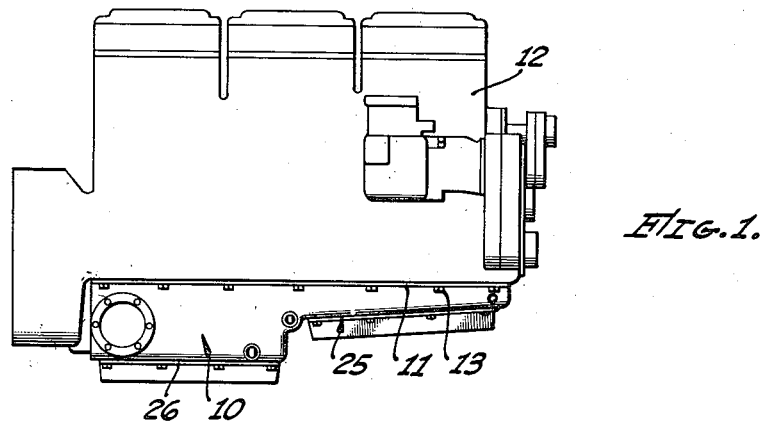
Figure 1 is a side elevation of an internal combustion engine and having an oil pan attached thereto comprising a preferred embodiment of my invention.
Figure 2:
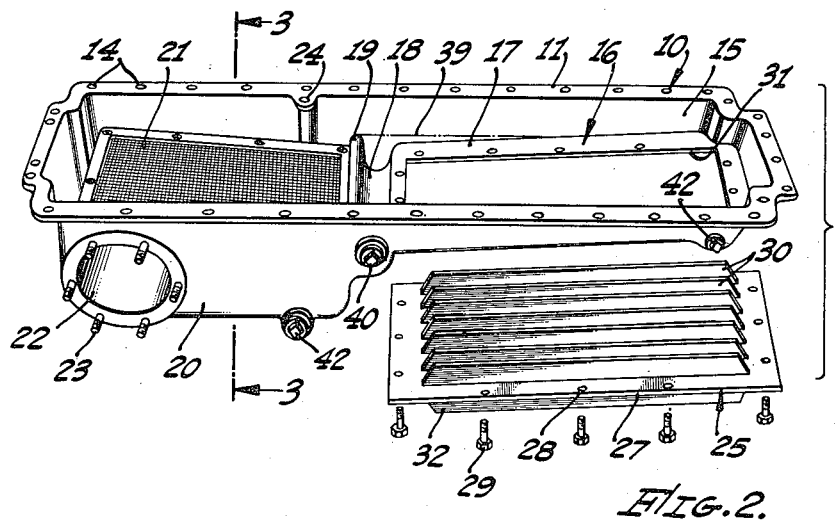
Figure 2 is a perspective view of the oil pan shown in Figure 1, one of the metallic heat exchange members being shown in disassembled position.

Referring to the drawings, the oil pan generally designated 10 is provided with an upper continuous flange 11 adapted to be secured under the block of an engine 12 and held in operative position by means of bolts 13 extending through apertures 14 in the flange 11. Side walls 15 extend downwardly from the upper flange 11 and support a structure generally designated 16. The side wall 15 and bottom structure 16 cooperate to form an enclosure open at the top. The forward portion of the bottom structure 16 of the pan 10 may include an inclined drain section 17 leading to a gutter or sludge collector 18 which comprises a depression extending transversely across the oil pan 10. One side of the sludge collector 18 is formed by a dam 19. The rearward portion of the bottom structure 16 is formed as a sump 20 which may be covered by a removable screen 21. A side opening 22 may be provided in the sump if desired for reception of a filter unit (not shown). The filter unit may be axially inserted into the opening 22 and secured in place by means of the projecting studs 23. A conduit 24 is provided in the pan structure 10 leading from the sump or filter element to an oil pump (not shown) driven by the engine 12.

A major portion of the pan 10 including the side walls 15, sump 20 and a part of the bottom structure 16 is preferably molded as an integral unit and formed from a rubber-like oil-resisting material adapted to resist temperatures which the engine lubricating oil may reach during operation of the engine. Such material being nonmetallic, does not vibrate in resonance with engine vibrations but on the contrary acts as a vibration absorber or vibration dampener. Substances of this type may include synthetic rubberlike compounds such as neoprene. Plastic materials which are heat and oil resistant and soft enough to act as vibration absorbers or vibration dampeners may also be employed.

Figure 3:
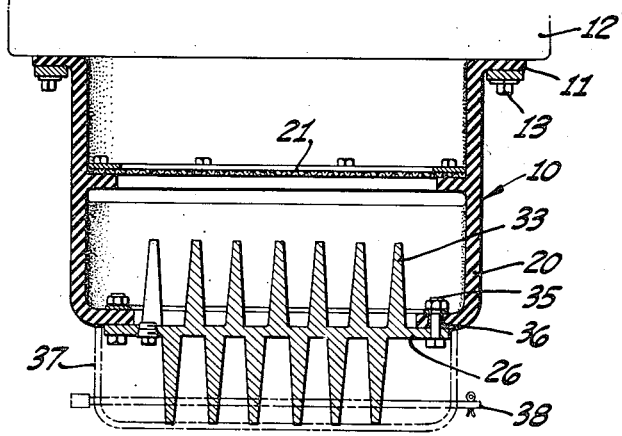
Figure 3 is a sectional elevation taken substantially on the lines 3—3 as shown in Figure 2.

The thermal properties of such material are, however, rather poor, and accordingly more efficient heat exchange surfaces are desirable in order that the oil in the pan may be cooled. Therefore, I provide one or more removable metallic heat exchange members which are secured to and form a part of the bottom structure 16 of the pan 10. One of these metallic heat exchange units is attached to the drain section 17 and is identified by the numeral 25, and the other may be mounted to form the bottom of the sump 20 and is identified by the numeral 26. The heat exchange member 25 may be provided with a flange 27 having apertures 28 through which bolt elements 29 may be projected for the purpose of removably securing the heat exchange member to the bottom section 16. Parallel vertically extending cooling fins 30 project upwardly from the level of the flange 27 into the opening 31 provided in the drain section 17. Additional cooling fins 32 may be provided which extend downwardly into the air stream below the engine 12. As shown in Figure 3, the heat exchange member 26 may be provided with parallel fins 33 extending upwardly into the sump 20 and similar downwardly extending fins 34 projecting into the air stream below the engine 12. Bolts 35 extending through aligned apertures in the member 26 and bottom structure 16 serve to secure the member 26 in position to form the bottom of the sump 20. If desired metallic sleeves 36 may encircle each of the bolts 35 to limit the compression of the rubber-like material through which the bolt extends.

For operation in cold weather it may be desirable to minimize the cooling effect provided by the fins 32 and 34, and in such event a nonmetallic boot 37 may be placed around the downwardly extending fins and held in place by a transverse pin 38 extending through aligned apertures in the fins. The boot may be removed by withdrawing the pin 38.

In operation, oil falling from the interior of the engine impinges on the heat exchange member 25 and flows downwardly along the incline toward the sludge collector 18. The dam 19 extends to a sufficiently high elevation within the pan enclosure to maintain a pool of oil on the member 25 for efficient cooling. The level of the pool is indicated by the dashed line 39. A removable plug 40 is provided in the side wall adjacent the sludge collector 18 to permit removal of sludge and other foreign matter collected in the gutter behind the dam 19, and without requiring removal of the entire pan structure. Oil flowing over the dam 19 passes through the screen 21 into the sump. If a filter unit is employed within the opening 22 the oil passes through this filter unit before reaching the conduit 24 which is connected to the oil pump (not shown). If a filter unit is not employed the opening 22 and studs 23 are omitted. The usual drain plugs 41 and 42 may be provided as shown.

In some installations it may be desirable to embed one or both of the heat exchange members 25 and 26 integrally with the molded rubber-like material forming the side walls of the pan 10, rather than to make the heat exchange members removable. It is also contemplated that it may be desirable in certain cases to eliminate the upwardly extending cooling fins or the downwardly extending cooling fins, or both.

From the above description it will be understood that a light weight pan structure is provided which is not subject to fatigue failure under vibration and which provides excellent heat transfer properties for cooling oil within the pan.

Having fully described my invention, it is to be understood that I do not wish to be limited to the details herein set forth, but my invention is of the full scope of the appended claims.

I claim:

1. In a composite oil pan for an internal combustion engine, the combination of side walls and bottom structure cooperating to define an enclosure open at the top, the side walls being formed of nonmetallic vibration dampening material for supporting the bottom structure, and the bottom structure including a metallic heat transfer member for cooling oil within the pan enclosure.

2. In a composite oil pan for an internal combustion engine, the combination of side walls and bottom structure cooperating to define an enclosure open at the top, the side walls being formed of nonmetallic vibration dampening material for supporting the bottom structure, and the bottom structure including a removable metallic heat transfer member for cooling oil within the pan enclosure.

3. In a composite oil pan for an internal combustion engine, the combination of side walls and bottom structure cooperating to define an enclosure open at the top, the side walls supporting the bottom structure being formed of oil-resistant vibration dampening material, and the bottom structure including a metallic heat transfer member for cooling oil within the pan enclosure.

4. In a composite oil pan for an internal combustion engine, the combination of side walls and bottom structure cooperating to define an enclosure open at the top, the side walls being formed of nonmetallic fatigue-resisting material and disposed to support the bottom structure, and the bottom structure including a metallic heat transfer member having fins extending into the pan enclosure.

5. In a composite oil pan for an internal combustion engine, the combination of a flange for connecting the pan to an engine; side walls depending from the flange, said walls being formed of vibration absorbing material adapted to inhibit build up of resonant vibrations in the pan during operation of the engine; and means forming a pan bottom supported from said walls, said means including a metallic heat transfer member for cooling oil within the pan.

6. In a composite oil pan for an internal combustion engine, the combination of a flange for connecting the pan to an engine; side walls depending from the flange, said walls being formed of rubber material adapted to minimize resonant vibrations in the pan during operation of the engine; and means forming a bottom structure supported from said walls, said means including a removable metallic heat transfer member for cooling oil within the pan.

7. In a composite oil pan for an internal combustion engine, the combination of a flange for connecting the pan to an engine; side walls depending from the flange, said walls being formed of rubber material adapted to minimize resonant vibrations in the pan during operation of the engine; means forming a bottom structure supported from said walls, said means including a removable metallic heat transfer member for cooling oil within the pan, the bottom structure and walls cooperating to a define a sump at an elevation below said heat transfer member; and a dam positioned between the sump and the heat transfer member adapted to maintain a pool of oil on the latter.

8. In a composite oil pan for an internal combustion engine, the combination of a flange for connecting the pan to an engine; side walls depending from the flange, said walls being formed of vibration absorbing material; and means forming a pan bottom structure supported from said walls, said means including an inclined metallic heat transfer member provided with internal and external cooling fins for cooling oil within the pan.

9. In an oil pan for an internal combustion engine, the combination of side walls and bottom structure cooperating to define an enclosure open at the top, the side walls supporting the bottom structure and being formed of nonmetallic vibration absorbing material adapted to inhibit build up of resonant vibrations in the pan occasioned by operation of the engine.

10. In an oil pan for an internal combustion engine, the combination of side walls and bottom structure cooperating to define an enclosure open at the top, the side walls supporting the bottom structure and being formed of oil-resistant rubber material adapted to inhibit build up of resonant vibrations in the pan occasioned by operation of the engine.

11. In a composite oil pan for an internal combustion engine, the combination of walls formed of vibration absorbing material adapted to inhibit build up of resonant vibrations in the pan occasioned by operation of the engine; means forming bottom structure supported from said walls and including an inclined drain member and a gutter positioned along the lower-end thereof; a sump below said gutter, one of the walls having a clean-out opening for said gutter.

12. In a composite oil pan for an internal combustion engine, the combination of walls formed of vibration absorbing material adapted to inhibit build up of resonant vibrations in the pan occasioned by operation of the engine; means forming bottom structure supported from said walls and including an inclined drain member and a gutter positioned along the lower end thereof; a sump below said gutter; a dam between the sump and the gutter, one of the walls having a clean-out opening for said gutter.

13. In a composite oil pan for an internal combustion engine, the combination of a flange for connecting the pan to an engine; side walls depending from the flange, said walls being formed of oil-resistant rubber material adapted to inhibit build up of resonant vibrations in the pan occasioned by operation of the engine; means forming a pan bottom structure supported from said walls including an inclined drain member and a sump at the lower end thereof, the sump having a removable bottom comprising a metallic heat transfer member for cooling oil within the sump.

14. In a composite oil pan for an internal combustion engine, the combination of side walls and bottom structure cooperating to define an enclosure open at the top, the side walls supporting the bottom structure and being formed of oil-resistant rubber material, and the bottom structure including a removable metallic heat transfer member having external cooling fins; and a nonmetallic boot removably secured to the bottom structure and adapted to enclose said fins.

MICHAEL F. HALL.

REFERENCES CITED

The following references are of record in the file of this patent:

UNITED STATES PATENTS

| Number | Name | Date |
|---|---|---|
| 828,896 | Muir | Aug. 21, 1906 |
| 1,365,438 | Adamson | Jan. 11, 1921 |
| 2,300,583 | Marsac | Nov. 3, 1942 |

FOREIGN PATENTS

| Number | Country | Date |
|---|---|---|
| 287,732 | Italy | 1931 |